United States Patent [19]
Hayashi et al.

[11] Patent Number: 5,379,373
[45] Date of Patent: Jan. 3, 1995

[54] DOCUMENT LAYOUT PROCESSING METHOD AND DEVICE FOR CARRYING OUT THE SAME

[75] Inventors: Naoki Hayashi; Kazuo Saito, both of Tokyo, Japan

[73] Assignee: Fuji Xerox Co., Ltd., Japan

[21] Appl. No.: 714,264

[22] Filed: Jun. 12, 1991

[30] Foreign Application Priority Data

Jun. 15, 1990 [JP] Japan ................. 2-157068

[51] Int. Cl.⁶ ............................................. G06F 15/20
[52] U.S. Cl. ................................. 395/148; 395/145; 395/146; 395/161
[58] Field of Search ............... 395/148, 145, 146, 149, 395/150; 364/419

[56] References Cited

U.S. PATENT DOCUMENTS 4,751,740  6/1988  Wright ..................... 395/145 X

OTHER PUBLICATIONS

"ODA-Standard für Bürodokumente verbessert den Informationsfluss", Helmut Kreiner, Burokommunikation, pp. 460–464.
ISO 8613: Information Processing-Text and Office System-Office Document Architecture (ODA) and Interchange Format, 1989.

Primary Examiner—Heather R. Herndon
Assistant Examiner—Cliff N. Vo
Attorney, Agent, or Firm—Welsh & Katz, Ltd.

[57] ABSTRACT

A document layout processing device involving the generation of a layout structure of a particular document based on a limitation of a layout structure common to a plurality of documents, an intermediate data structure generating unit generates a minimum layout structure common to all specific layout structures which can be generated from the layout structure common to the plurality of documents and an intermediate data structure indicating a data structure related to a layout which represents information about a manipulation indicating whether addition or deletion of a specific structure to or from the minimum layout structure is possible. The intermediate data structure is held in the intermediate data structure holding unit. In document processing, an intermediate data altering unit alters the intermediate data structure held in the intermediate data structure holding unit, on the basis of the content of a particular document to be laid out and the information about the manipulation which is included in the intermediate data structure itself held in the intermediate data structure holding unit. A specific layout structure extracting unit extracts a layout structure corresponding to the particular document to be laid out, from a newest intermediate data structure held in the intermediate data structure generating unit.

9 Claims, 16 Drawing Sheets

FIG.13(a) (PRIOR ART)  FIG.13(b) (PRIOR ART)
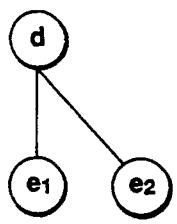
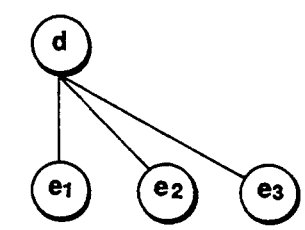
FIG.14(a) (PRIOR ART)  FIG.14(b) (PRIOR ART)
FIG.15(a) (PRIOR ART)  FIG.15(b) (PRIOR ART)
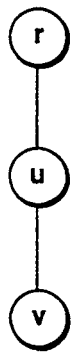
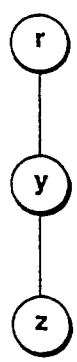
FIG.16(a) (PRIOR ART)
FIG.16(b) (PRIOR ART)
FIG.16(c) (PRIOR ART)
FIG.16(d) (PRIOR ART)

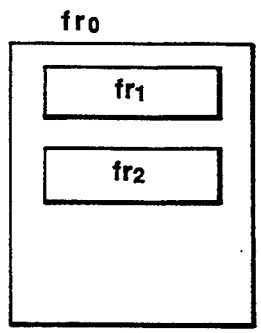
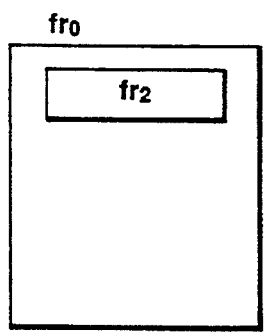
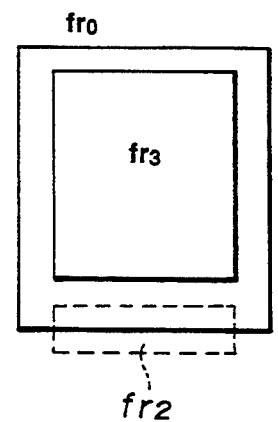
FIG.17(a)
*(PRIOR ART)*
FIG.17(b)
*(PRIOR ART)*
FIG.17(c)
*(PRIOR ART)*
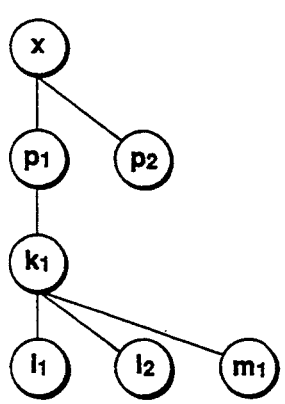
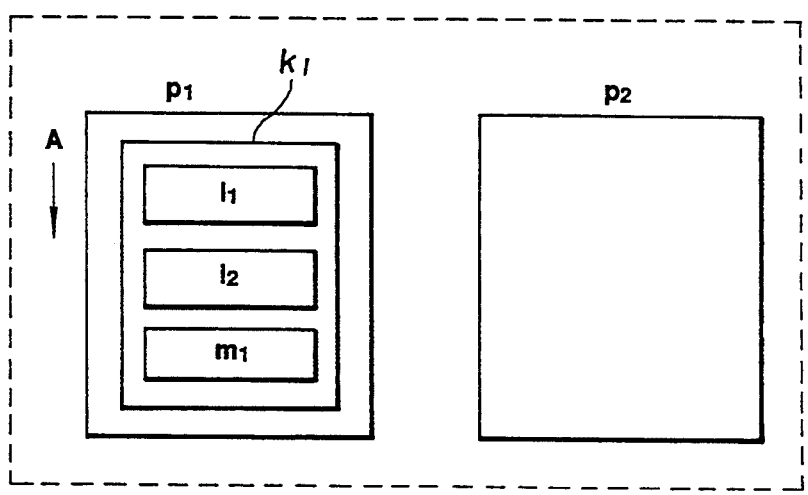
FIG.18(a)
*(PRIOR ART)*
FIG.18(b)
*(PRIOR ART)*

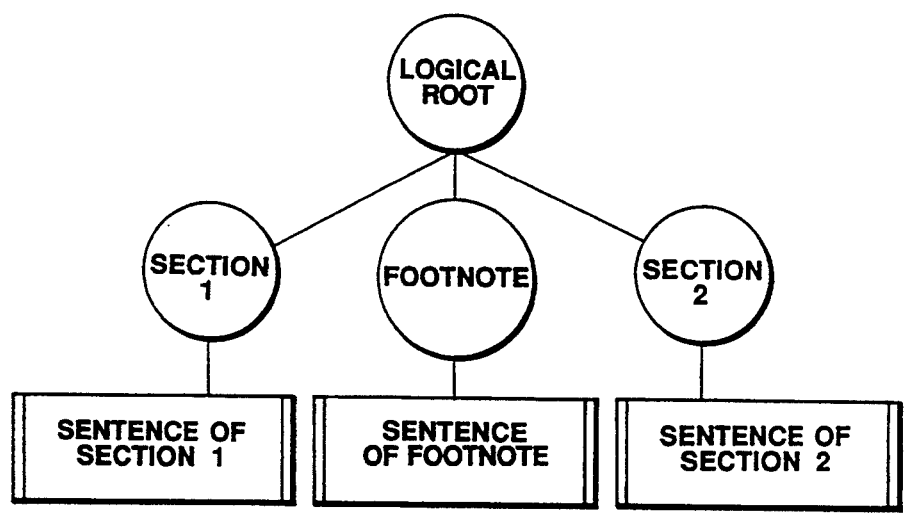
FIG. 19
(PRIOR ART)
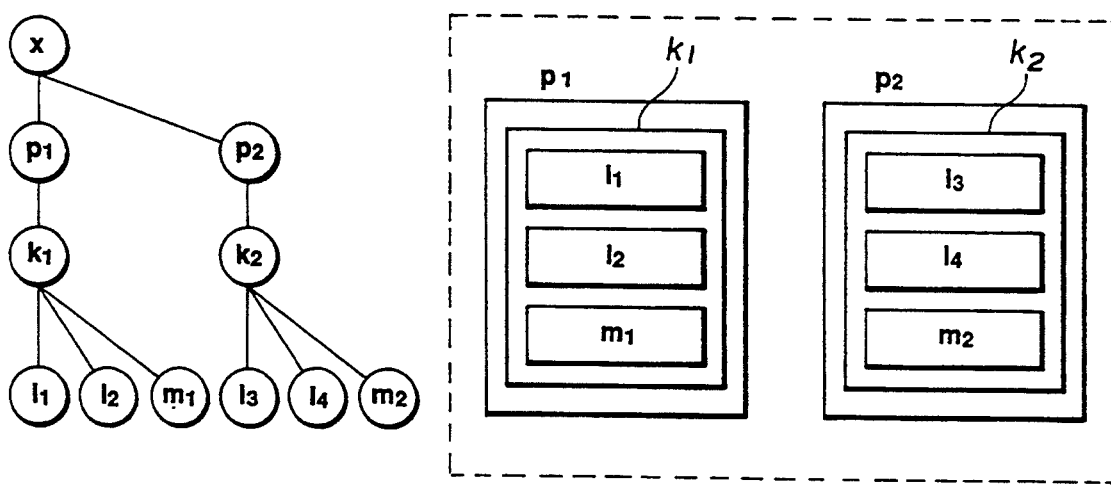
FIG. 20(a)
(PRIOR ART)
FIG. 20(b)
(PRIOR ART)

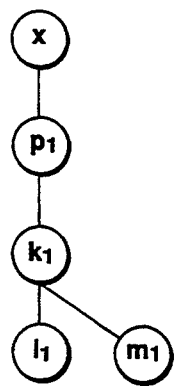 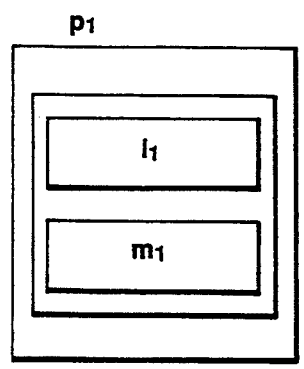
FIG.21(a) FIG.21(b)
*(PRIOR ART)* *(PRIOR ART)*
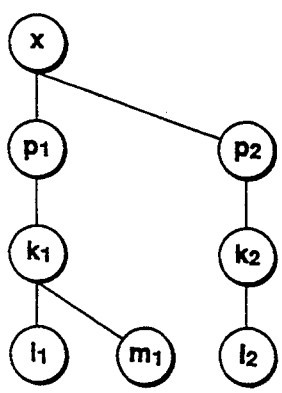 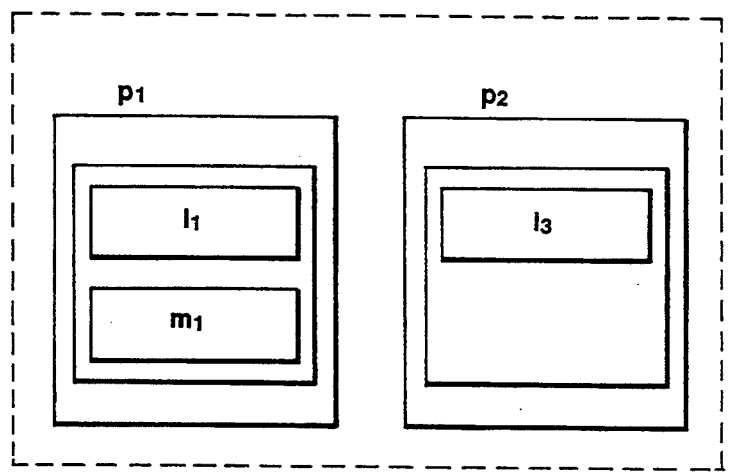
FIG.22(a) FIG.22(b)
*(PRIOR ART)* *(PRIOR ART)*

DOCUMENT LAYOUT PROCESSING METHOD AND DEVICE FOR CARRYING OUT THE SAME

BACKGROUND OF THE INVENTION

1. Field of the Invention

The present invention relates to a document layout processing method for generating a specific layout structure on the basis of a generic layout structure and the content of a particular document to be laid out, and to a device for carrying out such a method.

2. Description of the Related Art

In recent years, it has been proposed to perform Layout of a document (document processing) on the basis of the concept of a so-called structured document according to which one document is handled as a combination of a logical structure based on its sections and paragraphs and a layout structure which represents how the content of the document is to be actually arranged.

One example of document layout processing has recently been realized which is based on an office document architecture (hereinafter referred to as the "ODA") (ODA=ISO 8613: Information Processing-Text and Office System-Office Document Architecture (ODA) and Interchange Format (1989)) which belongs to the system of OSI (Open System Interconnection) proposed by the ISO (International Standards Organization).

According to the ODA, one document has, in addition to its layout structure, a logical structure which represents a structure obtained by logically grasping sections, paragraphs and the like. The content of a particular document is linked to logical objects positioned at the lowest level of a specific logical structure. FIG. 11 shows the relation between the specific logical structure and the document content linked thereto. In FIG. 11, the upper and lower portions with respect to the chain line indicated by an arrow A correspond to the specific logical structure and the document content, respectively.

The ODA enables automatic layout processing which automatically generates a specific layout structure permitted by a generic layout structure, according to document contents linked to the specific logical structure, and links the specific logical structure to a specific layout structure via the document content. To automatically generate the specific layout structure according to the document linked to the specific logical structure indicates a series of manipulations, for example, a process in which if a certain document content is not completely laid out in a subordinate structure of a certain page object, a new page object is automatically generated and the overflown document content is laid out in the new page object.

FIG. 12 shows an example of the structure of a laid out document. In FIG. 12, the upper portion with respect to the chain line indicated by the arrow A corresponds to the specific logical structure, while the lower portion with respect to the chain line indicated by an arrow B corresponds to the specific layout structure. The example of FIG. 12 shows a case where although the content of Paragraph 2.1 of Section 2 is to be laid out on a first page, the content is too long to be laid out within the first page so that the content of Paragraph 2.1 of Section 2 is divided into halves and the latter half is laid out on a second page.

It is to be noted that, according to the ODA, each layout object class in the generic layout structure has an expression called a structure expression as an attribute "generator for subordinates" (hereinafter referred to as a "GFS") to represent a specific layout structure which can be generated. The structure expression is an expression representative of limitations of a structure immediately subordinate to a layout object belonging to a corresponding layout object class. The structure expression consists of a combination of specific terms and an object class identifier (hereinafter referred to as a "class ID").

The meaning of the terms will be described below.

It is assumed here that "a" and "b" indicate layout objects belonging to classes identified by the class IDs "A" and "B", respectively.

(1) The class ID is a symbol for primarily identifying each class within the generic layout structure.

(2) If a structure expression containing the class ID term is evaluated, one layout object belonging to a layout object class indicated by the class ID is generated as the evaluation result of the class ID term.

(3) If a structure expression containing the term SEQ is evaluated, the evaluation result of terms which follow the term SEQ indicates that the evaluated terms are linked in that order.

For example, the evaluation result of the structure expression (SEQ A B) is (a b).

(4) If a structure expression containing the term AGG is evaluated, the evaluation result of terms which follow the term AGG indicates that the evaluated terms are linked in arbitrary order.

For example, the evaluation result of the structure expression (AGG A B) is (a b) or (b a).

(5) If a structure expression containing the term CHO is evaluated, the evaluation result of terms which follow the term CHO indicates that any one of the evaluated terms is selected.

For example, the evaluation result of the structure expression (CHO A B) is (a) or (b).

(6) If a structure expression containing the term OPT is evaluated, the evaluation result is either an evaluated term which follows the term OPT or nothing.

For example, the evaluation result of the structure expression (OPT A) is (a) or "nothing".

(7) If a structure expression containing the term REP is evaluated, the evaluation result indicates that an evaluated term which follows the term REP is repeated once or an arbitrary number of times more than once.

For example, the evaluation result of the structure expression (REP A) is (a), (a a), (a a a), . . . , or (a a . . . a).

In addition, such a structure expression can be represented as a combination of terms selected from the aforesaid terms, for example, in the form of (SEQ(CHO A B)(OPT C)). The evaluation result of the structure expression (SEQ(CHO A B)(OPT C)) is (a), (a c), (b) or (b c). Each layout object class in the generic layout structure has any of the above-described structure expressions in its GFS.

Regarding the kind of immediately subordinate object which can be linked to a layout object belonging to a certain class, the layout object is limited by the structure expression contained in the GFS of the certain class. In other words, an object corresponding to any of the evaluation results of the structure expression can only be immediately linked to the layout object as a subordinate object. For example, if a layout object class whose class ID is "X" has the structure expression (SEQ(CHO A B)(OPT C)) in its GFS, the layout object a can be immediately linked to a layout object x which belongs to the layout object class having the class ID "X", but it is impossible to link both of the layout objects a and b to the same.

As a related art concerning document processing (hereinafter referred as "layout processing") which utilizes a generic structure and a specific structure to generate a specific layout structure on the basis of a document content and a generic layout structure, there is a method of sequentially generating the specific layout structure by sequentially trying a plurality of choices related to structure generation which are described in the generic layout structure. In such a method, a desired part of a document content is laid out by selecting one choice from the choices in a predetermined order. If the layout fails, the next choice is selected in the predetermined order to execute layout processing. At this time, to cancel the specific layout structure generated according to the immediately previous choice, generation and deletion of layout objects are performed so as to match the state of the layout to the new choice.

An example of the generation and deletion of layout objects resulting from the alteration of the choices will be explained below by using the above-described notation according to the ODA. For example, if the class A has the structure expression (CHO B C) as its GFS, this structure expression is evaluated on the basis of left-depth-first-search, so that B is rendered a first choice and C a second choice. A specific layout structure generated on the basis of the first choice B is as shown in FIG. 13(a). If the layout of a document content according to the specific layout structure fails, the second choice C is selected, and the layout object b which is immediately subordinate to the layout object a belonging to the class A is deleted and a layout object c is newly linked to the layout object a as an immediately subordinate object, thereby matching the specific layout structure to the second choice C. Thus, the specific layout structure is changed into that shown in FIG. 13(b).

If a class D has the structure expression (REP E) as its GFS, an $n^{th}$ choice is Es repeated by (n+1) times. (This evaluation method is hereinafter referred to as an "empty-box method".) A specific layout structure generated on the basis of a first choice is as shown in FIG. 14(a). In the specific layout structure, if a part of a document content is not completely laid out within a layout object e1 and the overflown document content is laid out in a layout object e2, a second choice is selected and a layout object e3 is newly linked to an object d belonging to the class D, thereby matching the specific layout structure to the second choice. Thus, the specific layout structure is changed into that shown in FIG. 14(b).

If a class F has the structure expression (OPT H) as its GFS, a first choice is "H" and a second choice is "no subordinate structure". A specific layout structure generated on the basis of the first choice H is as shown in FIG. 15(a). If the layout of a document content according to the specific layout structure fails, the second choice is selected, and a layout object h which is immediately subordinate to a layout object f belonging to the class F is deleted to match the specific layout structure to the second choice. Thus, the specific layout structure is changed into that shown in FIG. 15(b).

The above example has been described with reference to a subordinate structure which is one-level lower than a certain layout object. The following explanation is made in connection with another example in which: a class R has the structure expression (CHO U Y) as its GFS; a class U has the structure expression (SEQ V) as its GFS; and a class Y has the structure (SEQ Z) as its GFS. In this case, a layout object u is first selected as a structure which is one-level lower than the class R, and the resultant specific layout structure has an arrangement in which, as shown in FIG. 16(a), a layout object u belonging to the layout class u is generated at a level subordinate to a layout object r belonging to the class R.

In addition, since it is possible that there exits a structure which is one-level lower than the layout object class U, a layout object class V is selected. Accordingly, the specific layout structure is altered to have an arrangement in which, as shown in FIG. 16(b), the layout object v belonging to the layout class V is generated at a level subordinate to the layout object u.

If the above-described layout fails, there is no other choice in the layout object class U and the processing proceeds to a superior class, i.e., the class R. In the class R, the layout object class Y which is the second choice is selected. The specific layout structure has an arrangement in which, as shown in FIG. 16(c), the previously generated layout objects u and v are deleted and a layout object y belonging to the layout object class Y is generated at a level subordinate to the layout object r.

In addition, since it is possible that there exits a structure subordinate to the layout object class Y, a layout object class Z is selected. Accordingly, the specific layout structure is altered to have an arrangement in which, as shown in FIG. 16(d), a layout object z belonging to the layout class Z is generated at a level subordinate to the layout object y.

As described above, the conventional layout processing has been carried out by performing sequential selection from a plurality of choices related to structure generation in each class on the basis of left-depth-first-search.

However, the above-described conventional layout processing has the following problems.

(1) Since the choices are always sequentially tried in a predetermined order, if a certain kind of layout object is to be obtained, a choice may be selected which, if tried, cannot lead to generation of the required object. As a result, generation and deletion of unnecessary layout objects take place and the efficiency of layout processing is impaired.

(2) Since the dimension and position of a layout object may be set to inappropriate values, the possibility that layout processing which should succeed may fail is extremely high.

The above problem (1) will be concretely explained.

In document processing, a document writer often feels a desire to positively designate a structure in which to lay out a certain part of a logical content.

In general, the designation required to satisfy such a desire can be described as a logical content and, for example, in the ODA, a layout designation attribute corresponds to such a designation. As an example, a page break for each section corresponds to this kind of designation, and the page-break designation is achieved by assigning an attribute value "object type page" to a layout instruction attribute "new layout object" in a logical object which corresponds to a section in the ODA. In this case, it is apparent that no new page can be obtained even if the number of frames which constitute a structure subordinate to a page is increased. In the above-described conventional layout processing, however, since choices are evaluated one by one in order, unnecessary processing takes place. For example, in the example shown in FIGS. 16(a) to 16(d), even if a desired kind of layout object is the layout object z, the layout object z is not obtained so long as the layout objects u and v are not generated. This case is a problem, particularly in a case where a layout object which is unnecessarily generated and deleted is followed by a layout object which has previously been laid out. This is because each layout object holds attributes such as a dimension and a position relative to a certain reference point in accordance with the ODA and if addition or deletion of a layout object occurs before a certain layout object, it is necessary to recalculate the attribute value of the certain layout object. For example, it is assumed that, as shown in FIG. 17(a), a layout object fr1 and a layout object fr2 are laid out within one frame fr0. If the layout object fr1 is deleted, the position of the layout object fr2 varies as shown in FIG. 17(b). In this state, if a layout object fr3 having a large dimension is inserted before the layout object fr2, the layout object fr2 will overflow from the frame fr0, with the result that layout processing of the document content which has been laid out as the layout object fr2 may also be performed again. As described above, addition or deletion of an unnecessary layout object lowers the efficiency of layout processing to a remarkable extent.

The above problem (2) will be concretely described below.

This problem arises from the fact that an unnecessary layout object having no laid out content always exists in a specific layout structure because the adoption of the empty-box method and the first evaluation of the subordinate-element generator OPT permit the existence of a subordinate structure.

Consideration will be given to what happens to a generic layout structure in which, for example, a class X has the structure expression (REP P) as its GFS, a class P has the structure expression (SEQ K) as its GFS, and a class K has the structure expression (REP L)(OPT M) as its GFS. This example shows a general structure which can apply to a case where a new frame is generated for each section and if there is a footnote, a frame is generated for it. Specifically, the class X is a layout root, the class P is a page class, the class K is a frame class corresponding to a document layout, the class L is a frame class for a section, and the class M is a frame class for a footnote. It is assumed here that each of the classes K and L has a variable dimension and a variable position and that each of their dimensions has a certain fixed minimum value.

The first choice described above has the content shown in FIGS. 18(a) and 18(b). FIG. 18(a) shows a specific layout structure, and FIG. 18(b) shows a visualized example of the specific layout structure. In FIG. 18(b), the dimension of each layout object l1 and l2 which is taken in the direction indicated by an arrow A has a minimum value. It is assumed here that the logical content to be laid out is represented as a tree structure as shown in FIG. 19 and that, in each section, the class L is assigned to the layout instruction attribute "new layout object" as a value and attributes "layout category" and "permitted categories" are exclusively defined so that only the footnote can be laid out in the class M. In this case, Section 1 is laid out in the layout object l1 and the footnote is then laid out in a layout object m1. If the number of sentences for the footnote is greater than the number of sentences which can be accommodated in the layout object m1, a new choice is selected and the specific layout structure shown in FIG. 18(a) is altered to have the arrangement shown in FIG. 20(a). As a result, the overflown footnote sentences are laid out in a layout object m2. Section 2 is laid out in the layout object l2, and if the sentences of Section 2 are completely accommodated in the layout object l2, the layout is completed. In the resultant layout, nothing is laid out in a layout object l3 or a layout object l4. Since at least the layout object l3 must exist as long as a layout object p2 exists, it is determined that the layout has failed as a whole.

However, if a value obtained by adding the dimensions of the respective layout objects m1 and m2 taken in the direction indicated by the arrow A of FIG. 18(b) is less than the minimum value of the dimension of the layout object l2 taken in the same direction, the layout will naturally succeed. This is because if the layout object l2 does not exist as the first choice, the layout object l1 has room to extend in the direction indicated by the arrow A of FIG. 18(b). FIGS. 21(a) and 21(b) show a specific layout structure obtained when the layout of the footnote is completed.

When Section 2 is to be laid out, not the layout object l2 but the layout object l3 is generated due to dimensional limitations and Section 2 is laid out in the layout object l3. Finally, the specific layout structure shown in FIGS. 22(a) and 22(b) is obtained and the layout succeeds. As described above, it has conventionally possible that layout processing does not accurately work because an unnecessary layout object is added to a specific layout structure.

SUMMARY OF THE INVENTION

It is, therefore, an object of the present invention to provide a document layout processing method and a device for carrying out the same, both of which can reliably and rapidly effect layout processing.

It is another object of the present invention to provide a document layout processing method and a device for carrying out the same, both of which can reduce an overhead by restraining generation and deletion of unnecessary layout objects.

It is another object of the present invention to provide a document layout processing method and a device for carrying out the same, both of which can rapidly effect generation and editing of a document according to a preset format.

To achieve the above objects, in accordance with a first aspect of the present invention, a minimum layout structure common to all specific layout structures which can be generated from a layout structure common to a plurality of documents is generated, and the minimum layout structure is altered in accordance with the content of a particular document to be laid out, thereby generating a generic layout structure corresponding to the content of the particular document.

In accordance with the first aspect of the present invention, when layout processing is to be executed, the minimum layout structure common to all specific layout structures which can be generated from the layout structure common to the plurality of documents is generated, and a specific structure is deleted from or added to the generated minimum layout structure in accordance with the content of a particular document to be laid out. Accordingly, during the layout processing, it is sufficient to alter the generated minimum layout structure in accordance with the content of the particular document to be laid out, whereby the layout processing can be rapidly effected.

In accordance with a second aspect of the present invention, there is a document layout processing device which comprises: intermediate data structure generating means for generating an intermediate data structure indicating a data structure related to a layout which represents a minimum layout structure common to all specific layout structures which can be generated from a layout structure common to a plurality of documents and information about a manipulation indicating whether addition or deletion of a specific structure to or from the minimum layout structure is possible; intermediate data structure holding means for holding the intermediate data structure generated by the intermediate data structure generating means; intermediate data structure altering means for altering the intermediate data structure held in the intermediate data structure holding means, on the basis of a document content to be laid out and the information about the manipulation which is included in the intermediate data structure itself held in the intermediate data structure holding means; and specific layout structure extracting means for extracting a layout structure corresponding to the document content to be laid out, from a newest intermediate data structure held in the intermediate data structure holding means.

In accordance with the second aspect of the present invention, prior to layout processing for a layout structure relative to a particular document to be laid out, the intermediate data structure generating means generates the intermediate data structure, and the intermediate data structure is held. Then, the specific structure relative to the minimum layout structure, which is included in the held intermediate data structure, is deleted or added on the basis of the content of the particular document to be laid out and the information about the aforesaid manipulation which is included in the intermediate data structure itself. The layout structure corresponding to the particular document to be laid out is extracted from the finally obtained intermediate data structure. Accordingly, when the content of the particular document is to be laid out, it is sufficient to alter the minimum layout structure in the intermediate data structure by making reference to the information about the manipulation within the intermediate data structure. Accordingly, it is possible to restrain generation and deletion of unnecessary structures (layout objects).

The other objects, features and advantages of the present invention will become apparent from the following detailed description taken in conjunction with the accompanying drawings.

BRIEF DESCRIPTION OF THE DRAWINGS

FIGS. 13a to 22b are views for explaining conventional document layout processing.

DESCRIPTION OF THE PREFERRED EMBODIMENTS

Preferred embodiments of the present invention will be described below with reference to FIGS. 1 to 10.

Figure 1:
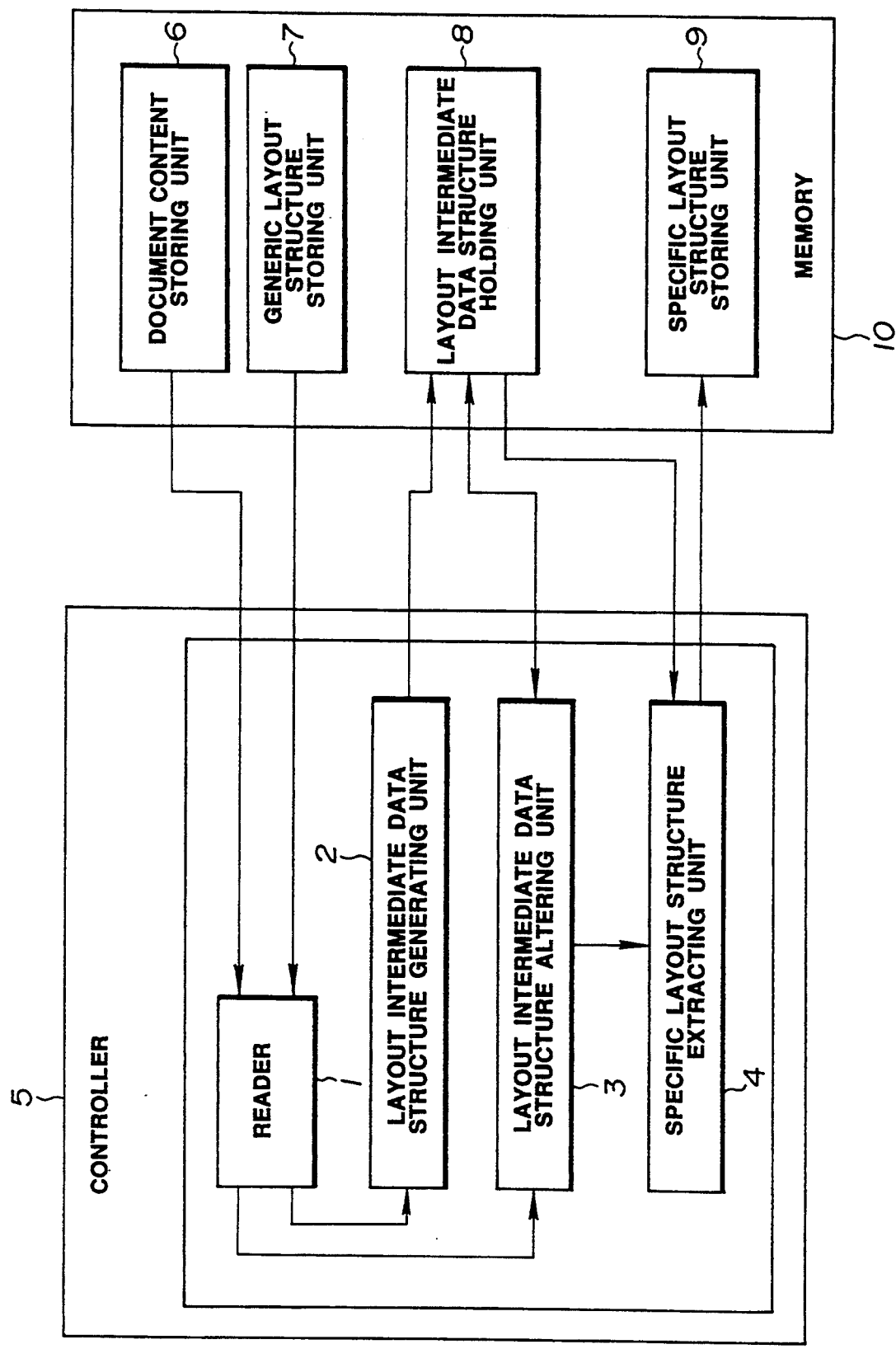
FIG. 1 is a block diagram schematically showing one embodiment of a document layout processing device according to the present invention.

FIG. 1 is a block diagram showing one embodiment of a document layout processing device according to the present invention. The device according to the embodiment shown in FIG. 1 can be applied to an apparatus for performing document layout processing based on the above-described ODA (office document architecture).

Referring to FIG. 1, the document layout processing device comprises a controller 5 and a memory 10. The controller 5 includes a reader 1, a layout intermediate data structure generating unit 2, a layout intermediate data structure altering unit 3 and a specific layout structure extracting unit 5. The memory 10 includes a document content storing unit 6 for storing the content of a document, a generic layout structure storing unit 7 for storing a generic Layout structure, a layout intermediate data structure holding unit 8 for holding an intermediate layout structure which will be described later, and a specific layout structure storing unit 9 for storing a specific layout structure.

The reader 1 reads the content of a document to be laid out from the document content storing unit 6, and outputs the document content to the layout intermediate data structure altering unit 3. The reader 1 also reads a generic layout structure from the generic layout structure storing unit 7 and outputs it to the intermediate data structure generating unit 2.

The layout intermediate data structure generating unit 2 generates both a minimum layout structure common to all specific layout structures which can be generated from the generic layout structure and a layout intermediate data structure representative of information which indicates what portion of the minimum layout structure can be manipulated to add or delete another structure. The layout intermediate data structure generating unit 2 holds these structures in the layout intermediate data structure holding unit 8.

The layout intermediate data structure altering unit 3 alters the held layout intermediate data structure on the basis of the content of the document to be laid out and the information included in the layout intermediate data structure itself held in the layout intermediate data structure holding unit 8. When the alteration is completed, the layout intermediate data structure altering unit 3 sends information to that effect to the specific layout structure extracting unit 4.

The specific layout structure extracting unit 4 extracts a specific layout structure from the layout intermediate data structure held in the layout intermediate data structure holding unit 8, on the basis of the information indicative of the completion of the alteration which has been sent from the layout intermediate data structure altering unit 3, and stores the specific layout structure in the specific layout structure storing unit 9.

It is to be noted that in this embodiment a tree structure is adopted as the layout intermediate data structure.

Figure 6:
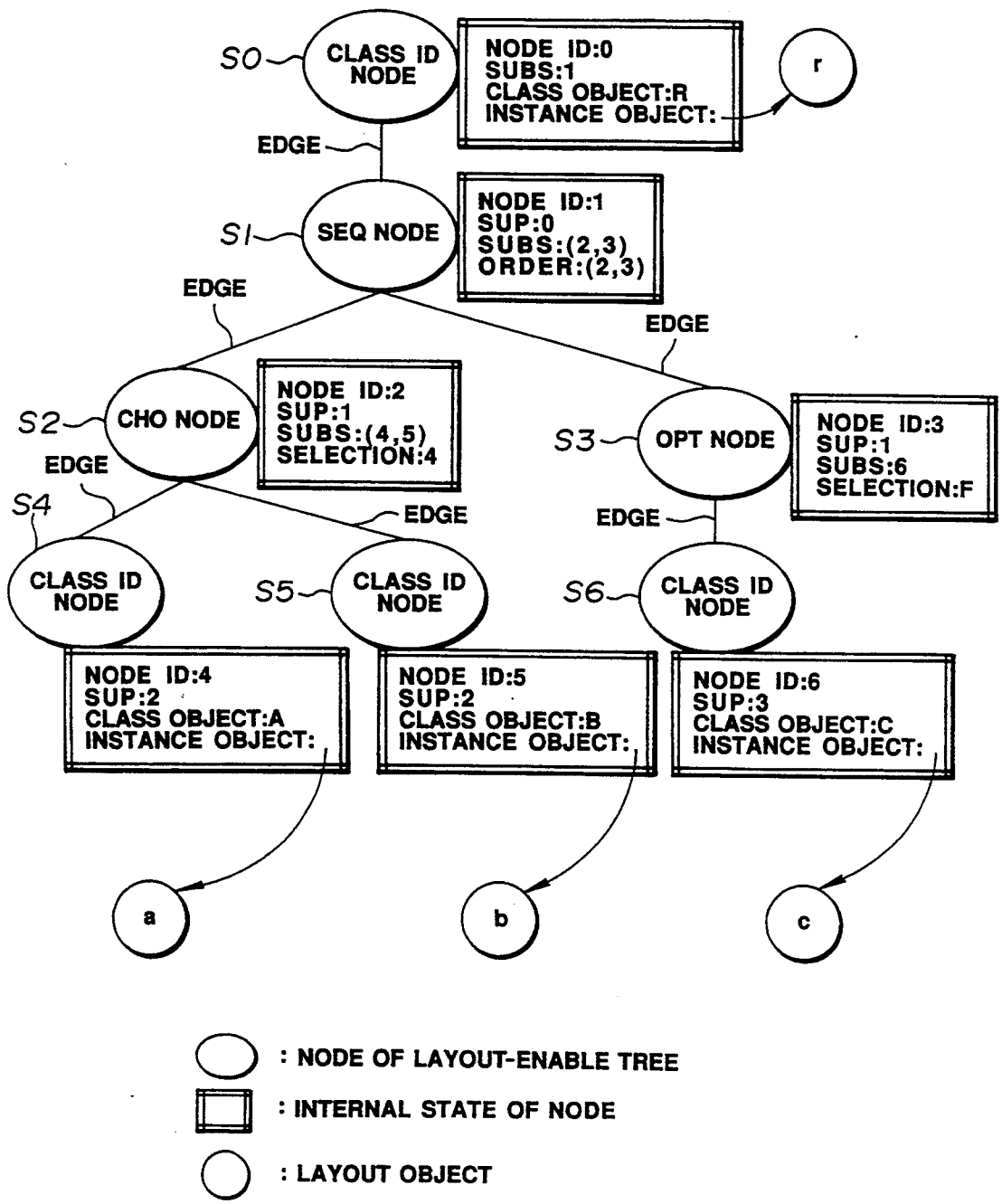
FIG. 6 is a diagram schematically showing one embodiment of the layout-enable tree structure.

For example, if a layout root class R has the structure expression (SEQ(CHO A B)(OPT C)) in its GFS (attribute: Generator for subordinates), a minimum layout-enable tree structure (hereinafter referred to as a "layout-enable tree") becomes a structure such as that shown in FIG. 6. In the structure expression, SEQ, CHO and OPT are subordinate-element generators, while A, B and C are object class identifiers (hereinafter referred to as "class IDs"). The subordinate-element generators includes AGG and REP in addition to the above noted SEQ, CHO and OPT, and these subordinate-element generators have definitions similar to those of the respective subordinate-element generators SEQ, CHO, OPT, AGG and RZP explained above in the description of the related art. In FIG. 6, the shown tree structure in which nodes S0 to S6 are linked by solid-line edges in accordance with a predetermined superior-subordinate relation represents the above-described minimum layout structure, and the internal state of each of the nodes represents information indicating what portion of the aforesaid minimum layout structure can be manipulated to add or delete another structure.

The kinds and content of nodes of the layout-enable tree will be described below.

The nodes of the layout-enable tree are classified into six kinds which correspond to terms expressed in different structure expressions, that is, an SEQ node, a CHO node, an AGG node, an OPT node, an REP node and a class ID node. The nodes have their internal states which are classified into a first group of internal states of the kind common to some of the nodes and a second group of internal states of the kinds unique to the respective nodes. None of the internal states has a value when their nodes are generated.

The internal states of the kinds common to the six nodes are "NodeID", "Sup" and "Subs". A symbol string for primarily identifying a node is substituted into the "NodeID" of the node, and the "NodeID" of a node positioned at a level immediately superior to the node is then substituted into the "Sup" of the latter node. The "Sup" has only one value. The "NodeID" of a node positioned at a level immediately subordinate to the node is substituted into the "Subs" of the latter node. The "Subs" may have a plurality of values. Accordingly, for example, an edge between two nodes N1 and N2 is formed if the "NodeID" of the node N2 exists in the "Subs" of the node N1 and the "NodeID" of the node N1 exists in the "Sup" of the node N2. Therefore, to form an edge between the node N1 and the node N2 indicates the manipulation of adding the "NodeID" of the node N2 to the "Subs" of the node N1 and replacing the value of the "Sup" of the node N2 with the content of the "NodeID" of the node N1. To cut the edge between the node N1 and the node N2 indicates the manipulation of deleting the "NodeID" of the node N2 from the "Subs" of the node N1 and deleting the value of the "Sup" of the node N2.

The SEQ node, the AGG node and the REP node have "Order" as their unique internal states. The "Order" indicates the order of a subordinate node of a node having the internal state "Order", and the order of "NodeIDs" in the "Subs" of the node having the internal state "Order" is substituted as the value of the "Order". In the case of the SEQ node, the manner of ordering the "NodeIDs" depends on the SEQ term of a corresponding structure expression and does not change during layout processing. In the case of the AGG node, the manner of ordering the "NodeIDs" can be varied during layout processing because it is possible that permutation of subordinate nodes will occur. In the case of the REP node, the manner of ordering the "NodeIDs" can be varied during layout processing, depending on an increase or a decrease in the number of subordinate nodes.

The CHO node and the OPT node have "Selection" as their unique internal states. The "Selection" indicates which of the subordinate structures of nodes having such states is selected for layout processing. The CHO node has any one Of the "NodeIDs" of the "Subs" of the corresponding node as the value of the "Selection". This indicates that the node indicated by the value of the "Selection" has been selected from among the choices of the CHO node and a structure (selected choice) subordinate to the CHO node has been used for layout. The OPT node has a symbol T or F indicative of a true or false value as the value of the "Selection". The symbol T indicates that a subordinate structure is laid out at the OPT node, while the symbol F indicates that no subordinate structure is laid out at the OPT node.

The class ID node has "ClassObject" and "InstanceObject" as its unique internal states. A class ID corresponding to the class ID node is substituted into the "ClassObject", and a layout object class belonging to the layout object class indicated by the "ClassObject" is substituted into the "InstanceObject". The "InstanceObject" has only one value.

A processing operation for generating a specific layout structure will be described below with reference to the flowcharts of FIGS. 2 to 5.

Figure 2:
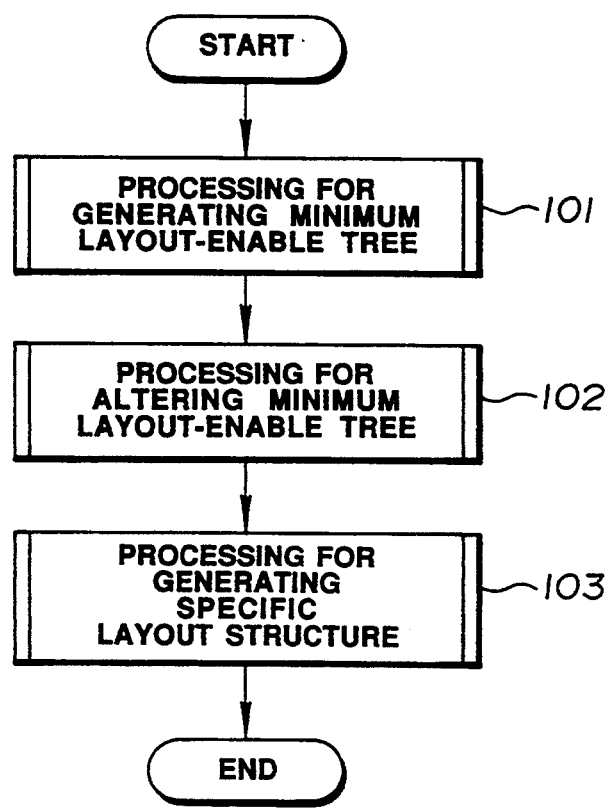
FIG. 2 is a flowchart showing the outline of a document layout processing operation.

Initially, the outline of processing executed by the controller 5 for generating a specific layout structure will be described below with reference to FIG. 2.

The controller 5 generates a minimum layout-enable tree while reading a generic layout structure stored in the generic layout structure storing unit 7, and holds the layout-enable tree in the layout intermediate data structure holding unit 8 (Step 101). The controller 5 then alters the layout-enable tree held in the layout intermediate data structure holding unit 8 while reading the content of a document stored in the document content storing unit 6, thereby causing the layout-enable tree to correspond to the document content (Step 102). Then, the controller 5 converts into a specific layout structure the final layout-enable tree held in the layout intermediate data structure holding unit 8, and writes the specific layout structure into the specific layout structure storing unit 9 (Step 103).

Figure 3:
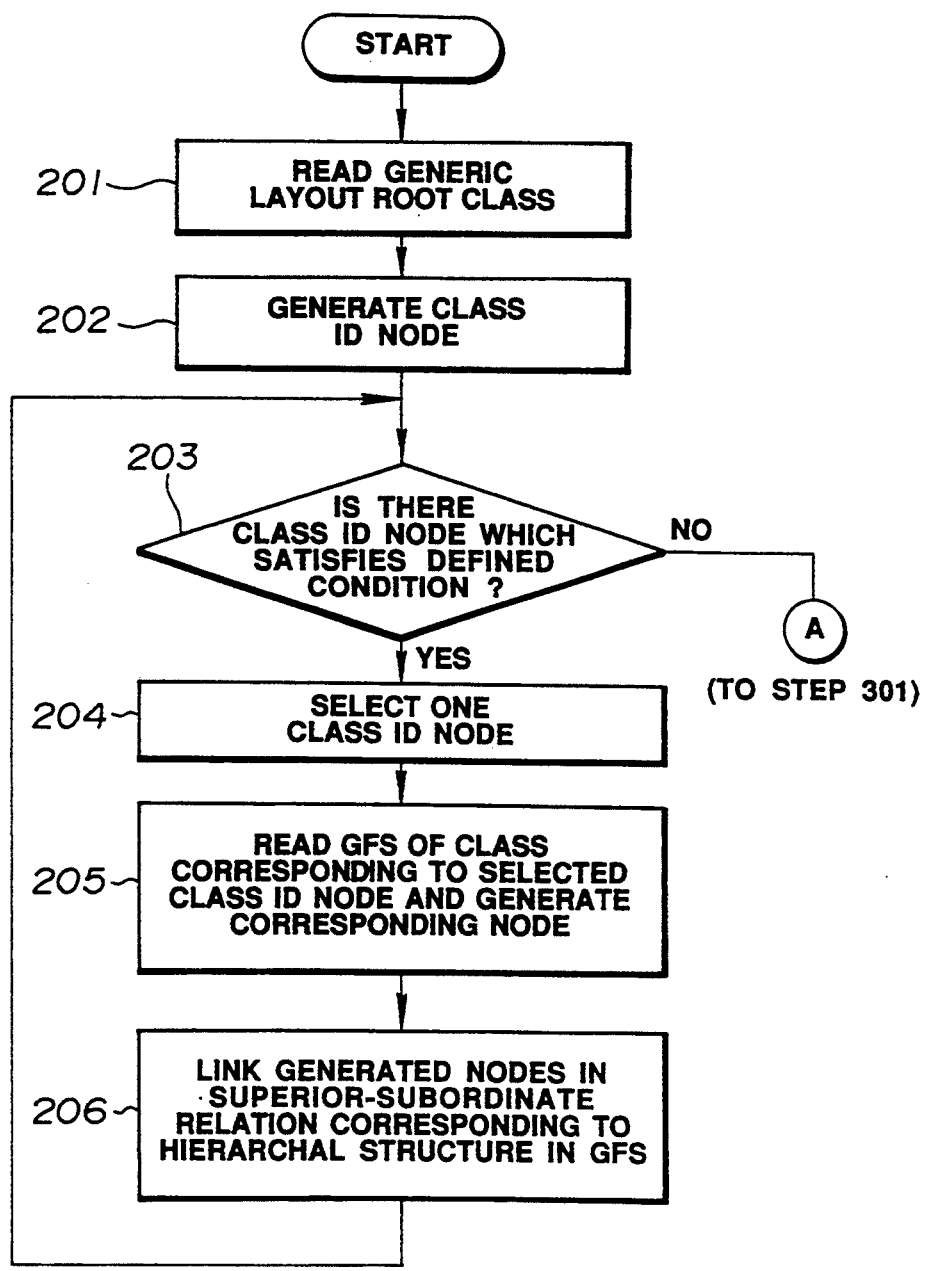
FIG. 3 is a flowchart showing a processing operation for generating a minimum layout-enable tree structure.

Processing executed by the controller 5 for generating the minimum layout-enable tree will be described below with reference to the flowchart of FIG. 3.

The controller 5 reads a generic layout root class from the generic layout structure storing unit 7 (Step 201), and generates a class ID node corresponding to the read class and holds the class ID node in the layout intermediate data structure storing unit 8 (Step 202). It is determined whether class ID nodes whose corresponding classes have GFSs and to which no subordinate nodes are linked are present among the class ID nodes stored in the layout intermediate data structure storing unit 8 (Step 203).

If such class ID nodes are present, the controller 5 selects one class ID node therefrom (Step 204), and reads the GFS of a class corresponding to the selected class ID node from the generic layout structure storing unit 7. The controller 5 generates a node for each term of the structure expression described in the read GFS and stores the node into the layout intermediate data structure storing unit 8 (Step 205).

The controller 5 links each of the nodes generated in Step 205 to an associated node by an edge in a superior-subordinate relation based on the hierarchal structure described in their GFSs, and links the highest-level node of the linked nodes to the class ID node selected in Step 205 (Step 206). After Step 206 has been completed, the process returns to Step 203, and the operation starting with Step 203 is repeated.

If no desired class ID node is present in Step 203, processing for altering the layout-enable tree is executed.

Figure 4:
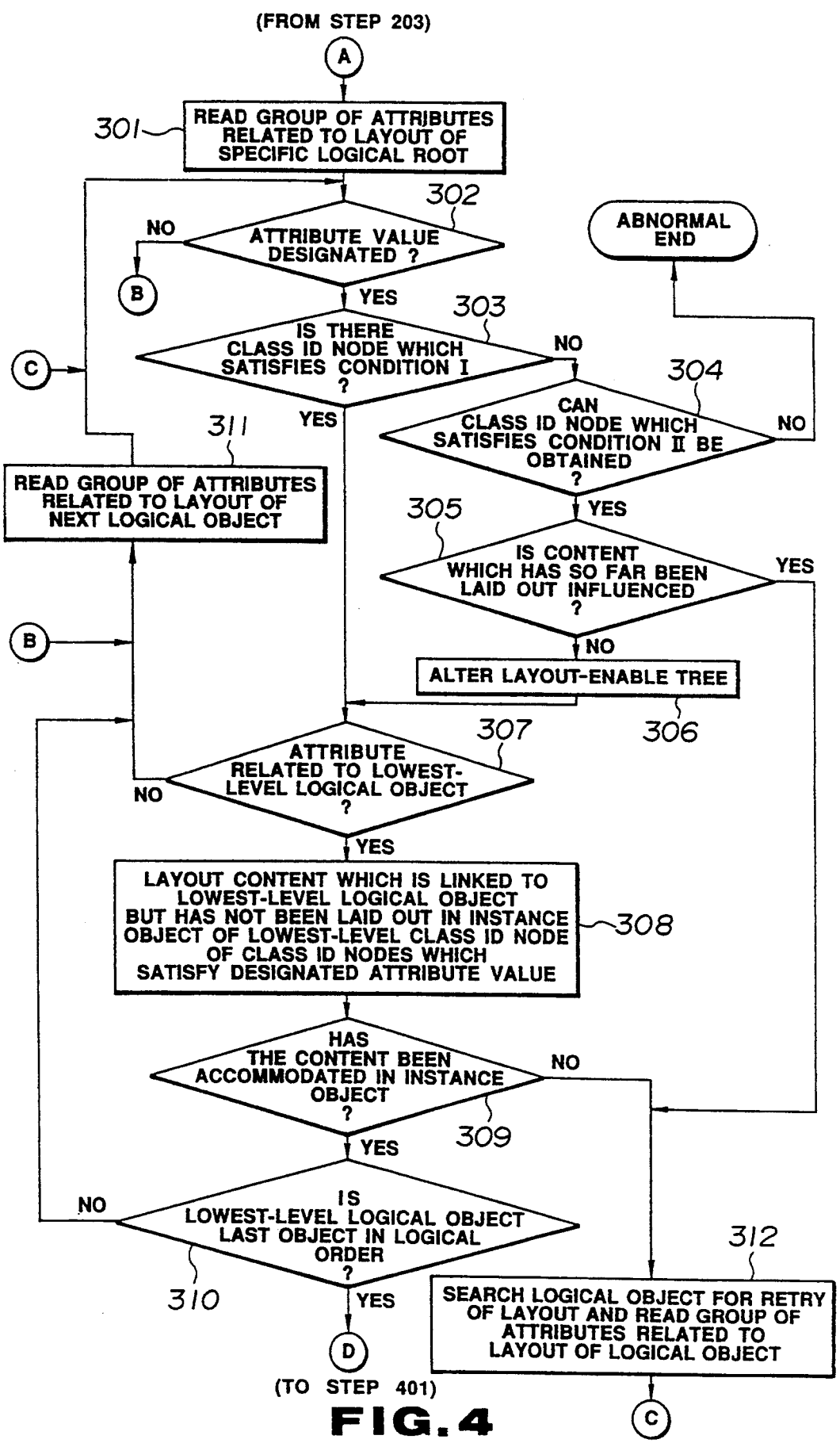
FIG. 4 is a flowchart showing a processing operation for altering the minimum layout-enable tree structure.

Processing executed by the controller 5 for generating the layout-enable tree will be described below with reference to the flowchart of FIG. 4.

Initially, the controller 5 reads a group of attributes related to the layout of a specific layout root from the document content storing unit 6 (Step 301), and determines whether an attribute value has been designated for the group of attributes (Step 302).

If it is determined that any attribute value has been designated, it is determined whether a class ID node which satisfies a condition I which will be described later is present in the layout-enable tree (Step 303).

It is assumed here that the condition I indicates that if the attribute value has been designated, the designated attribute value must be satisfied without altering the values of any nodes stored in the layout intermediate data structure holding unit 8.

If it is determined in Step 303 that there is no class ID node which satisfies the condition I, it is determined whether a class ID exists which satisfies a condition II which will be described later (Step 304).

It is assumed here that the condition II indicates that a designated attribute value must be satisfied by altering the value of a certain node of a held layout-enable tree.

If no class ID which satisfies the condition II is obtained in Step 304, the flow is brought to an abnormal end. If such a class ID is obtained, it is determined whether alteration of the value of the class ID node found in Step 304 influences other contents which have previously been laid out (Step 305). If it is determined in Step 305 that the other contents are not influenced, the layout-enable tree held in the layout intermediate data structure holding unit 8 is altered so as to satisfy the condition II of Step 304 (Step 306).

If Step 306 is completed or it is determined in Step 303 that the class ID node which satisfies the condition I exists, the controller 5 determines whether the attribute which has just been processed is an attribute related to the lowest-level logical object of a specific logical structure (Step 307). If it is determined that the attribute is that of the lowest-level logical object, a document content which is to be linked to the lowest-level logical object but has not yet been laid out is laid out in the "InstanceObject" of the lowestlevel class ID node of the class ID nodes which satisfy the attribute value designated in Step 302 (Step 308).

After Step 308 has been completed, the controller 5 determines whether all the contents laid out by the execution of Step 308 have been accommodated in the "InstanceObject" (Step 309). If it is determined that all the contents have been accommodated in the "InstanceObject", it is determined whether the logical object processed in Step 307 is the last object in logical order (Step 310). If it is determined that it is the last object in logical order, the controller 5 proceeds to processing for generating a specific layout structure.

If it is determined in Step 310 that the logical object processed in Step 307 is not the last object in logical order, if it is determined in Step 302 that no attribute value has been designated for the group of attributes, or if it is determined in Step 307 that it is not the lowest-level logical object, the controller 5 searches in the document content storing unit 6 a logical object which follows in logical order the logical object which has just been selected as a target to be processed, and reads a group of attributes related to the layout of the searched logical object from the document content storing unit 6 (Step 311). Thereafter, the flow returns to Step 302, and Step 302 and the following steps are executed.

If it is determined in Step 305 that the content which has previously been laid out is influenced and if it is determined in Step 309 that all the contents are not accommodated in the "InstanceObject", the controller 5 searches a logical object appropriate for layout retry and reads an attribute value related to the searched logical object (Step 312). Thereafter, the flow returns to Step 302, and Step 302 and the following steps are executed.

Figure 5:
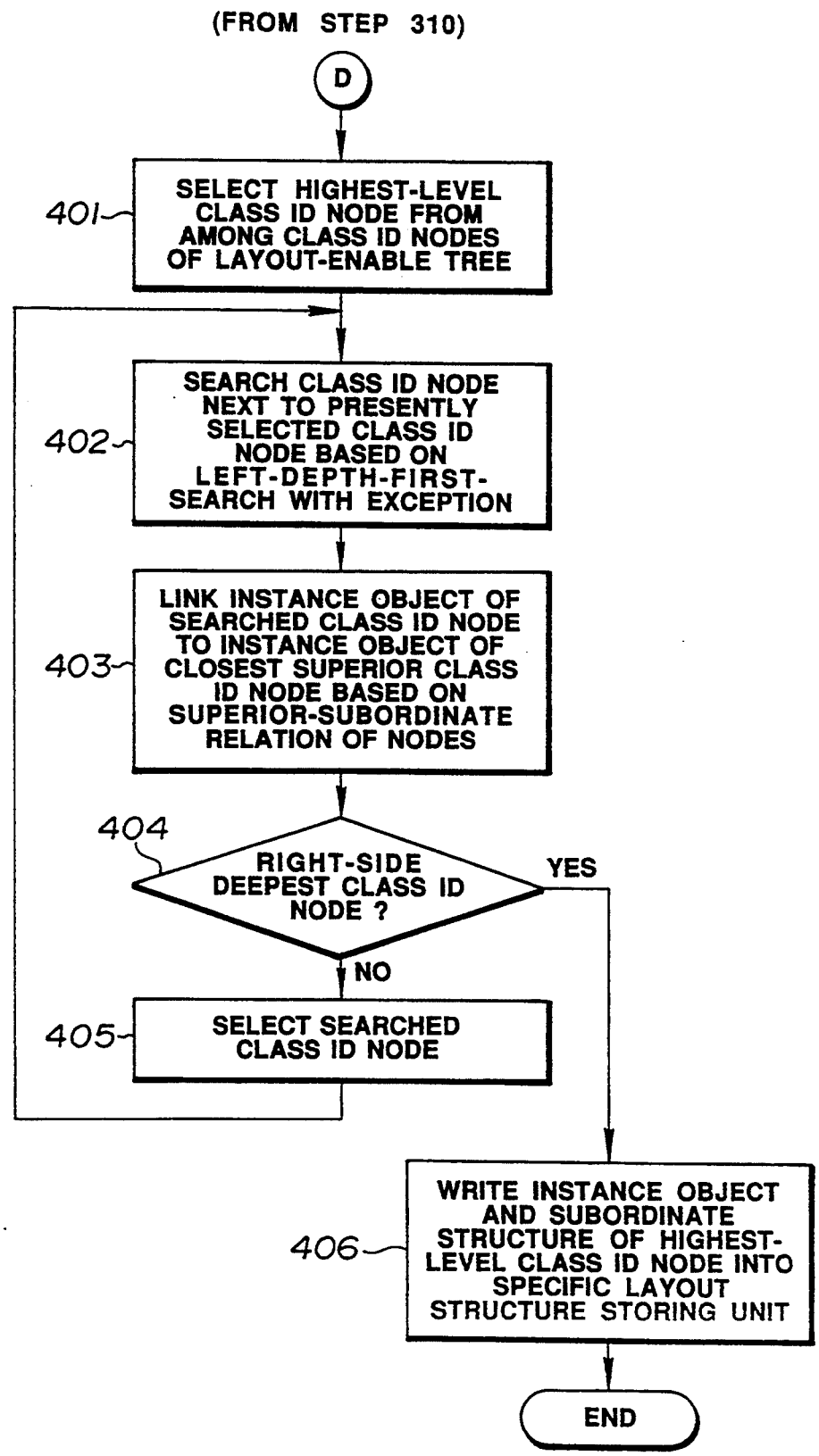
FIG. 5 is a flowchart showing a processing operation for generating a specific layout structure.

A processing operation to be next executed for generating a specific layout structure if it is determined in Step 310 that the lowest-level logical object is the last object in logical order, will be explained below with reference to FIG. 5.

The controller 5 first selects the highest-level class ID node from among the class ID nodes of the layout-enable tree stored in the layout intermediate data structure holding unit 8 (Step 401), and searches a class ID node next to a class ID node which has presently been selected, on the basis of left-depth-first-search with an exception (Step 402). The exception is that it is determined that only an edge leading to a contact indicated by the "Selection" of a CHO node exits at a level subordinate to the CHO node and if the "Selection" of an OPT node indicates "F", it is determined that no edge exists at a level subordinate to the OPT node.

The controller 5 links the "InstanceObject" of the searched class ID node to that of a superior class ID node closest thereto on the basis of the superior-subordinate relation between the nodes. At this time, if the superior "InstanceObject" has already had a subordinate object, the controller 5 links them so that the superior "InstanceObject" is placed in the last position in the relation of order indicated by the subordinate object (Step 403).

Then, the controller 5 determines whether the class ID node searched in Step 402 is a right-side deepest class ID node under a condition similar to the exception explained in connection with Step 402 (Step 404).

If the class ID node searched in Step 402 is not the right-side deepest class ID node, the controller 5 selects the searched class ID node (Step 405) and causes the flow to return to Step 402, thus executing Step 402 and the following steps. In the case of the right-side deepest class ID node, the controller 5 selects the highest-level class ID node from among the class ID nodes and writes into the specific layout structure storing unit 9 the "InstanceObject" (layout object) of the highest-level class ID node and its subordinate structure (the structure between layout objects) (Step 406).

Then, a processing operation for generating a specific layout structure will be described with reference to a specific example.

For example, it is assumed that the layout root class R has the structure expression (SEQ(CHO A B)(OPT C)) in its GFS.

Initially, the controller 5 generates one class ID node S0 corresponding to the layout root class R and holds the class ID node S0 in the layout intermediate data structure holding unit 8. Then, the controller 5 reads the structure expression written in the GFS of the layout root class R, i.e., (SEQ(CHO A B)(OPT C)), from the generic layout structure storing unit 7, and generates one node corresponding to each term of the read structure expression.

It is assumed here that, as the nodes corresponding to the respective terms of the structure expression, an SEQ node S1 is generated for the SEQ term, a CHO node S2 for the CHO node, an OPT node S3 for the OPT term, and class ID nodes S4 to S6 for the respective A, B and C terms.

The controller 5 links the nodes generated in accordance with the structure expression via edges, and holds the result in the layout intermediate data structure holding unit 8. The controller 5 also links via a new edge a node (the SEQ node S1) corresponding to the apex of the hierarchy of the interior of the structure expression to a node corresponding to the layout root class (the class ID node S0). Incidentally, when the controller 5 is to link the nodes in accordance with the structure expression, it sets values related to internal states ("NodeID", "Sup" and "Subs") common to the nodes as well as values related to unique internal states according to the kinds of nodes.

In the case of the values related to the unique internal states according to the kinds of nodes, the following values are set.

(a) If there is an SEQ node among the generated nodes, values indicative of the nodes are substituted into the "Order" of the SEQ node in accordance with the permutation of elements in the SEQ term corresponding to the SEQ node.

(b) If there is an AGG node among the generated nodes, values indicative of the nodes according to a combination of values in its "Subs" are substituted into the "Order" of the AGG node.

(c) If there is a CHO node among the generated nodes, an appropriate value is selected from its "Subs" and substituted into the "Selection" of the CHO node.

(d) If there is a class ID node among the generated nodes, a newly generated layout object is substituted into the "InstanceObject" of the class ID node.

By the above-described processing, a layout-enable tree which is immediately subordinate to the layout root is generated.

FIG. 6 shows the structure of a layout-enable tree immediately subordinate to a layout root r having the structure expression (SEQ(CHO A B)(OPT C)) in its GFS.

Subsequently, the controller 5 selects one class ID node from among the nodes (refer to FIG. 6) of the layout-enable tree immediately subordinate to the layout root which has just been generated. More specifically, the controller 5 selects one from the class ID nodes S4, S5 and S6 of the layout-enable tree shown in FIG. 6. If a structure expression is specified in the GFS of the class of the selected class ID node, the controller 5 reads a corresponding structure expression from the generic layout structure storing unit 7, generates a layout-enable tree immediately subordinate to the selected class ID node, links this layout-enable tree to the selected class ID node, and holds the result in the layout intermediate data structure holding unit 8. If no structure expression is specified in the GFS of the class of the selected class ID node, it is determined that the manipulation required for the class ID node has been completed.

The above-described manipulation for the class ID node is performed for all the class ID nodes. When the manipulation for all the class ID nodes is completed, the layout-enable tree held in the layout intermediate data structure holding unit 8 is obtained as the minimum layout-enable tree. Accordingly, if no structure expression is specified in the GFS of any of the class ID nodes S4, S5 and S6 of the layout-enable tree shown in FIG. 6, the layout-enable tree shown in FIG. 6 becomes the minimum layout-enable tree.

If a certain class ID node appears twice or more times, a class ID node is generated each time, except for a cyclic structure in which the structure of a superior class appears in the structure expression of a subordinate class.

Then, a specific layout structure is generated on the basis of the above-described minimum layout-enable tree.

Initially, a document content in a specific logical structure is made to correspond to the minimum layout-enable tree. Immediately subordinate structures which permit such correspondence differ with the kinds of nodes, and are as follows: all immediately subordinate structures, in the case of the SEQ node, AGG node and the class ID node; an immediately subordinate node whose "Selection" has the value "NodeID", in the case of the CHO node; and an immediately subordinate node whose "Selection has the value "T", in the case of the OPT node. For example, referring to the minimum layout-enable tree shown in FIG. 6, a node immediately subordinate to the SEQ node (the SEQ node S1) whose "NodeID" is "1" can be laid out. However, since the value of the "Selection" of the CHO node (the CHO node S2) whose "NodeID" is "2" is "4" and the value of the "Selection" of the OPT node (the OPT node S3) whose "NodeID" is "3" is "F", an object which is subordinate to the layout root r and which can be laid out is the layout object a alone.

If it has been impossible to adequately lay out the document content in the minimum layout-enable tree, processing for altering the internal state of each node is executed.

The internal states which can be altered are the "Order" of the AGG node, the "Subs" and "Order" of the REP node, the "Selection" of the CHO node, and the "Selection" of the OPT node. By altering the internal states, the pattern of a layout object into which to flow the document content is changed so that it is possible to achieve a structure in which the document content can be adequately laid out.

For example, if the value of the "Selection" of the OPT node (the OPT node S3) whose "NodeID" is "3"

is altered from "F" to "T", the layout object a and the layout object c are selected as layout objects which are subordinate to the layout root r and which can be laid out.

In this case, class ID nodes are found in the minimum layout-enable tree shown in FIG. 6, and a class ID node of "Class Object: C" (in this example, the class ID node S6) is selected from the class ID nodes. The processing proceeds to a node (in this example, the OPT node S3) superior to the selected class ID node (in this example, the class ID node S6), and the value of the "Selection" of the OPT node S3 is altered from "F" to "T".

Accordingly, if the document content is not accommodated in the layout object a only, a layout-enable area is increased by altering the value of the "Selection" of the OPT node S3 into "T", and the layout may succeed. In other words, even if the document content is not accommodated in the layout object a and a certain part overflows, a successful layout may be achieved by laying out the overflown part in the layout object c.

As described above, since the minimum layout-enable tree represents all specific layout structures which can be laid out, it can be determined what structure can be generated at a level subordinate to the subordinate-element generator CHO or OPT or what structures can be generated by the subordinate-element generator REP. Accordingly, when it is necessary to lay out a document content in an object belonging to a specific class, it can be readily determined what structure must be generated at a level subordinate to which object.

To obtain this kind of information, however, it has conventionally been necessary to repeat retry of layout objects as explained in connection with the processing for generating the specific layout structures shown in FIGS. 16(a) to 16(d). It follows that generation and deletion of unnecessary layout objects are frequently performed to impair the efficiency of layout processing.

Figure 7:
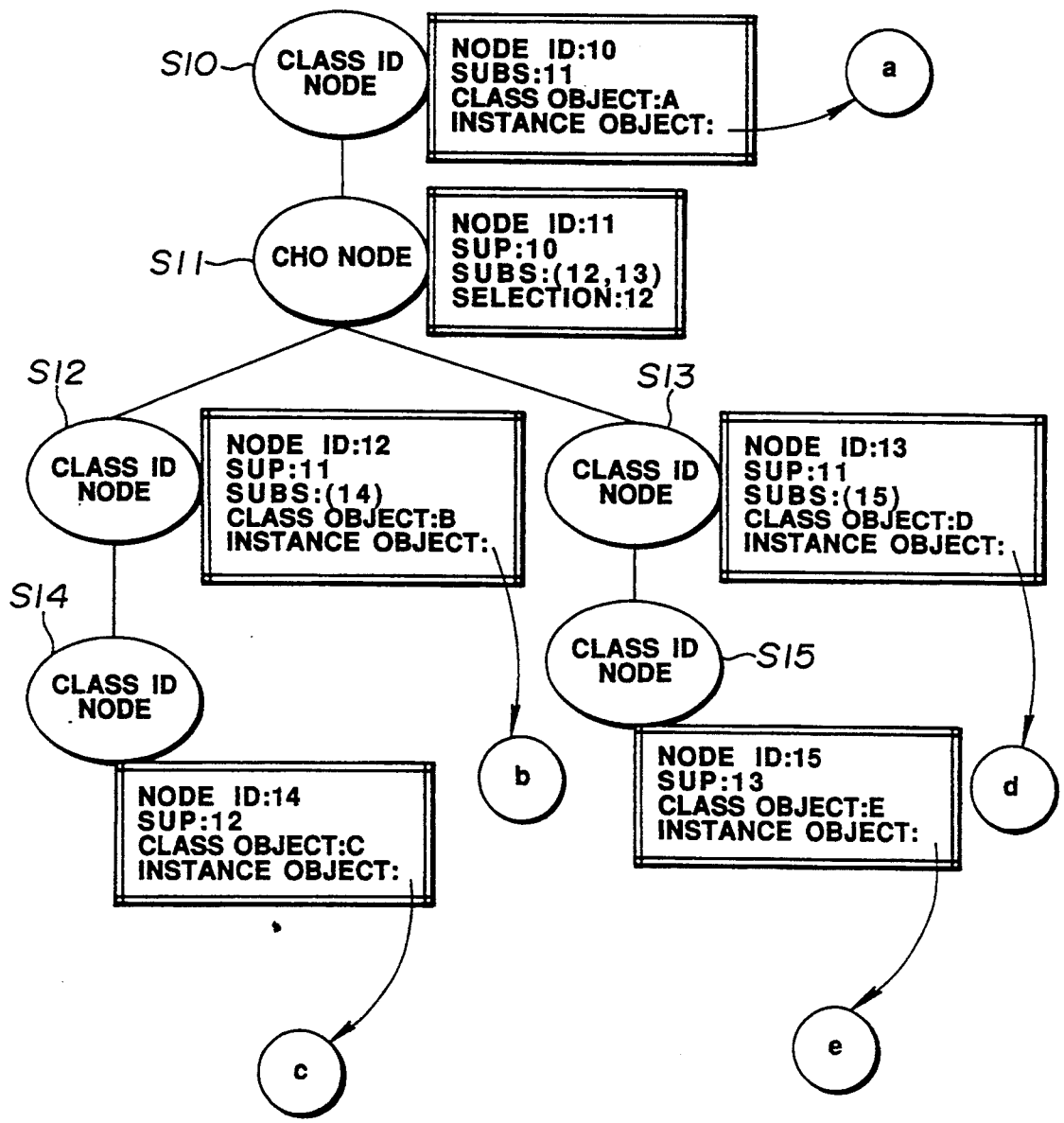
FIG. 7 is a diagram schematically showing another embodiment of the layout-enable tree structure.

It is assumed that, as a structure similar to a generic layout structure for generating the specific layout structures shown in FIGS. 16(a) to 16(d), for example, the layout object class A has the structure expression (CHO B D) as its GFS, the layout object class B the structure expression (SEQ C) as its GFS, and the layout object class D the structure expression (SEQ E) as its GFS. The obtained minimum layout-enable tree is shown in FIG. 7. In the case of the minimum layout-enable tree, since the value of the "Selection" of the CHO node whose "NodeID" is "11" is "12", a specific layout structure is obtained in which the layout object b is linked to the layout object a as a subordinate object. In the ODA (office document architecture), an event often occurs which requires a layout object e to be selected in the above-described state.

Figure 8:
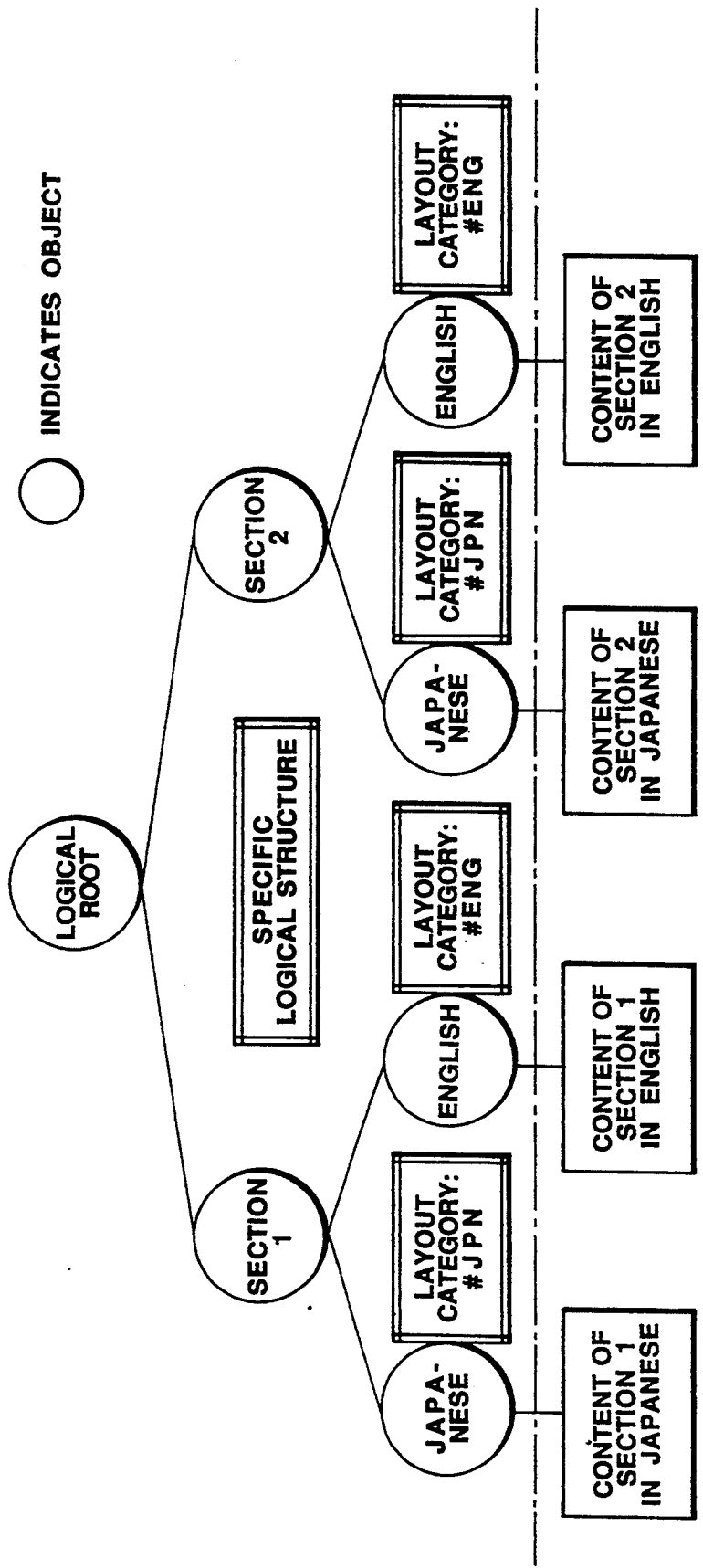
FIG. 8 is a diagram schematically showing one example of a specific logical structure.

The concept "category" used in the ODA is one example of a cause which gives rise to such an event. The "category" is defined such that, if a logical object and a frame object have the same category identifier, the logical object is laid out to the frame object. The "category" is defined such that, if a logical object and a frame object have the same category identifier, the logical object is laid out to the frame object. The "category" is utilized in, for example, a bilingual document prepared in Japanese and English. The specific logical structure of the bilingual document is shown in FIG. 8.

Figure 9:
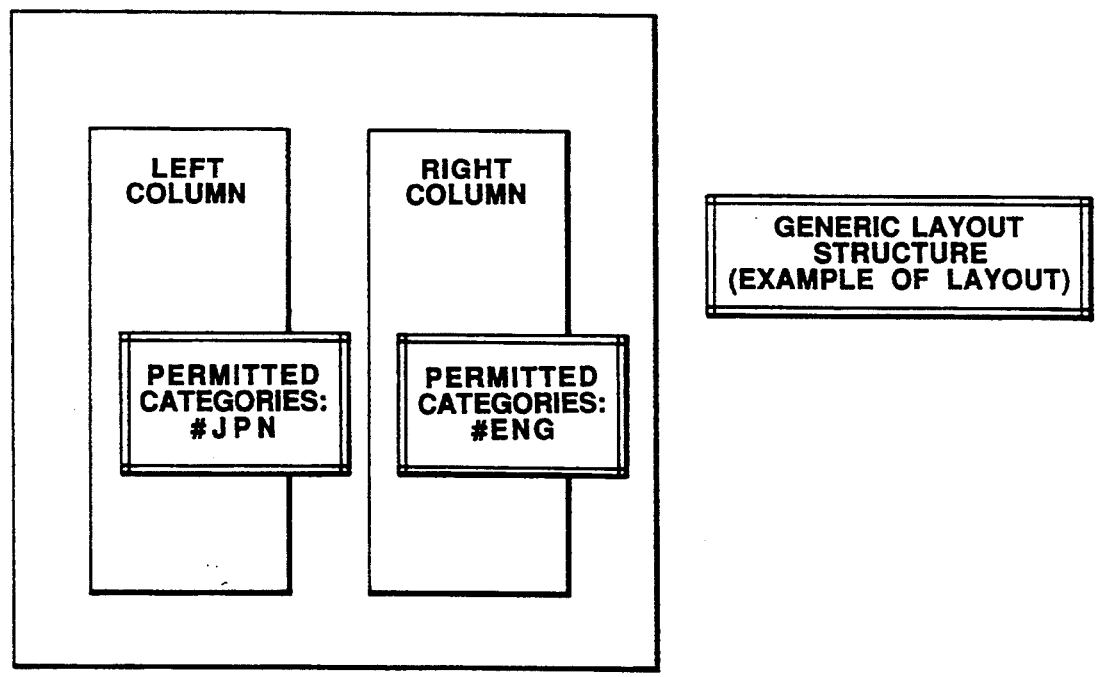
FIG. 9 is a view showing one example of a layout image represented by a generic layout structure in the specific logical structure shown in FIG. 8.

It is assumed that a logical object having a content written in Japanese has a category identifier #JPN as its attribute "layout category" and that a logical object having a content written in English has a category identifier #ENG as its attribute "layout category". It is also assumed that the document consists of two columns and that a frame object class constituting the left column has the category identifier #JPN as its attribute "permitted categories", while a frame object class constituting the right column has the category identifier #ENG as its attribute "permitted categories". A layout example of such a generic layout structure is shown in FIG. 9. In the layout example, if layout processing is executed, the Japanese and English contents are automatically laid out in the left and right columns, respectively.

In the minimum layout-enable tree shown in FIG. 7, it is assumed that "B", i.e., the "Class Object" of a class ID node S12, and "D", i.e., the "Class Object" of a class ID node S13, indicate page object classes and that "C", i.e., the "Class Object" of a class ID node S14, and "E", i.e., the "Class Object" of a class ID node S15, indicate frame object classes. It is also assumed that the frame object class C has a category identifier nEXT as its attribute "permitted categories" and the frame object class E has a category identifier #FIG as its attribute "permitted categories". It is further assumed that the category identifier #TEXT is a category representative of a document, while the category identifier #FIG is a category representative of a figure. Accordingly, the page object class B is the class of a page on which only a document is laid out, while the page object class D is the class of a page on which only a figure is laid out.

Figure 10:
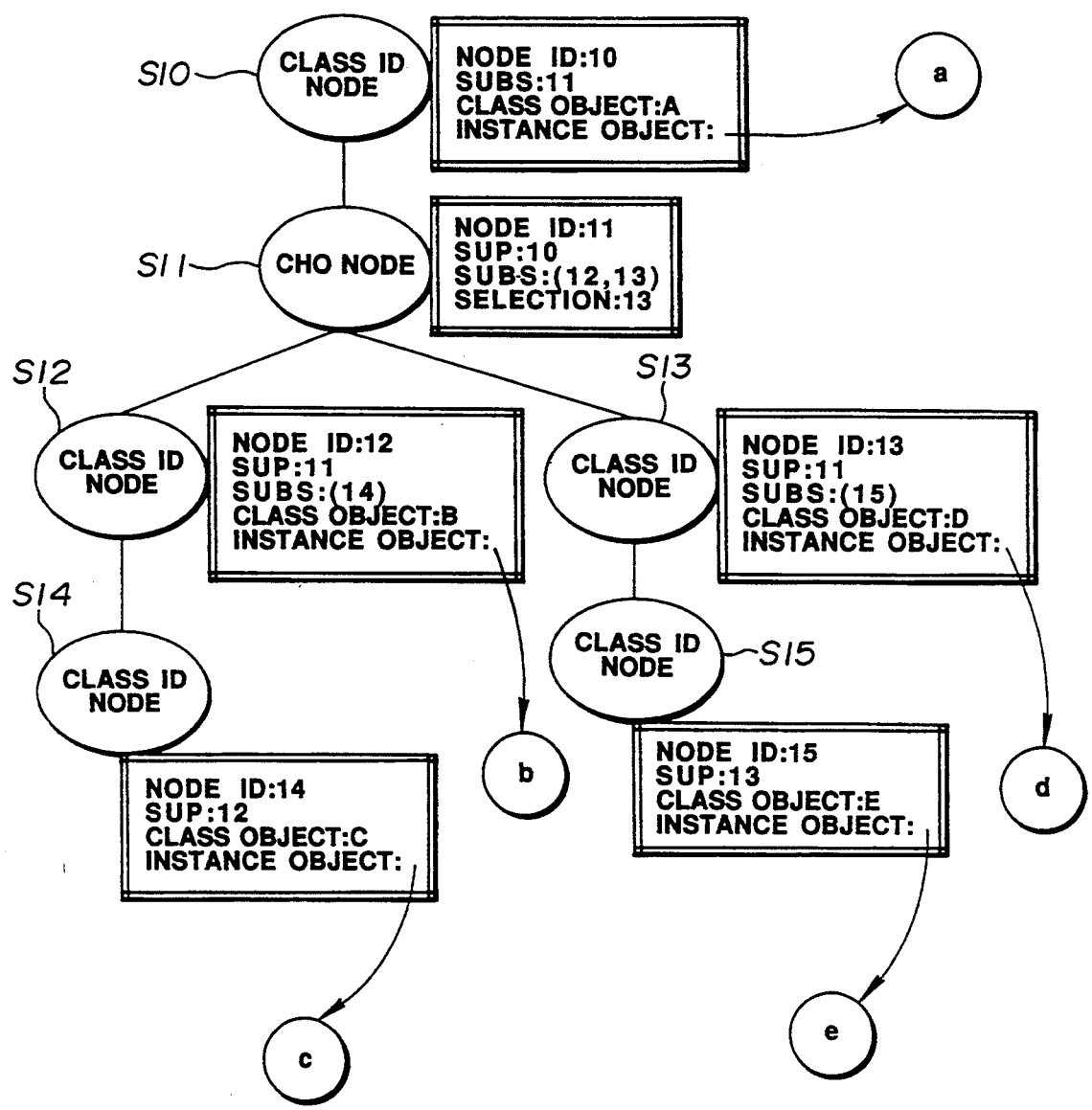
FIG. 10 is a structure diagram of one variation of the layout-enable tree structure shown in FIG. 7.
Figure 11:
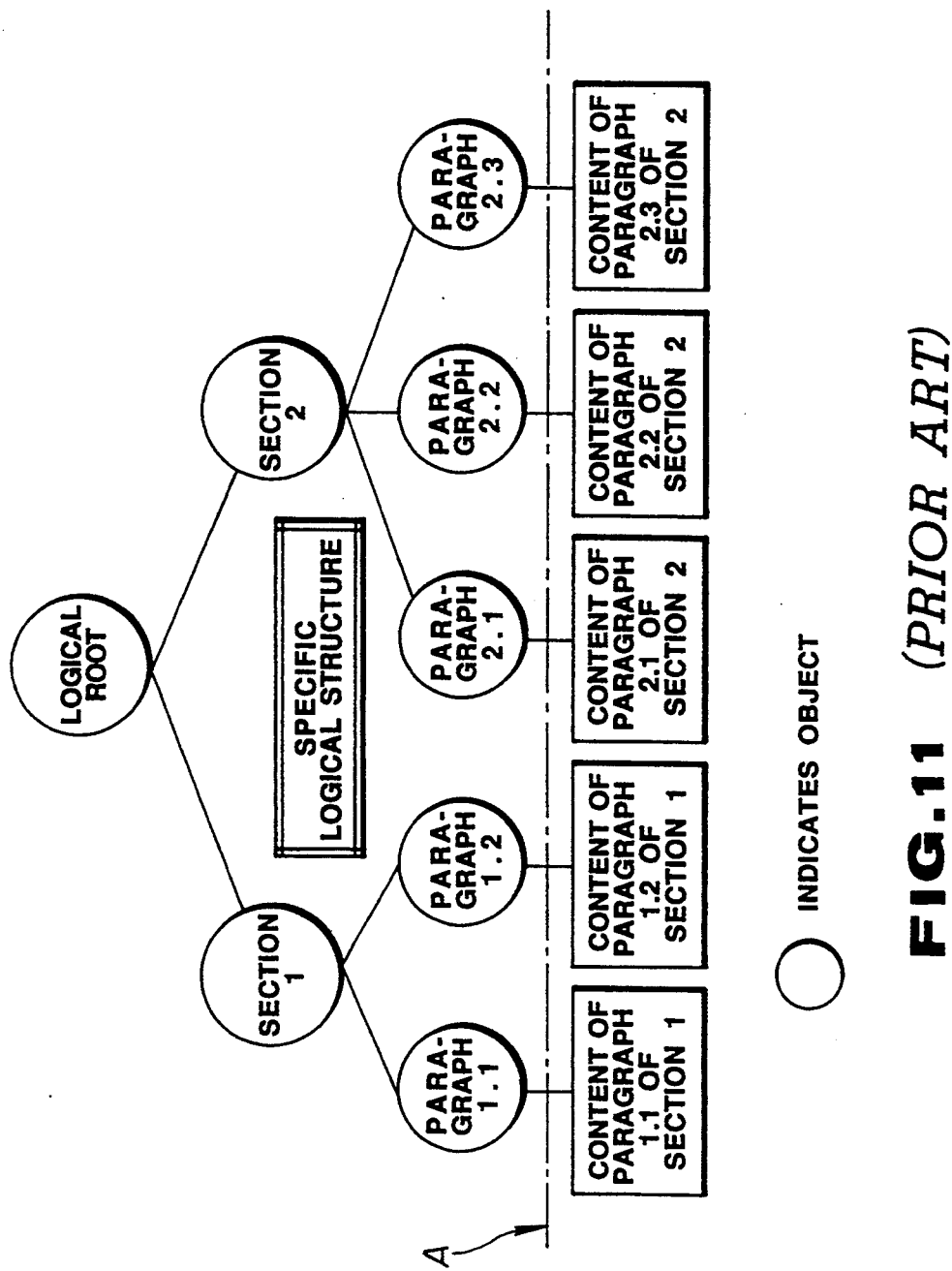
FIG. 11 is a diagram for explaining a specific logical structure in the ODA (office document architecture)
Figure 12:
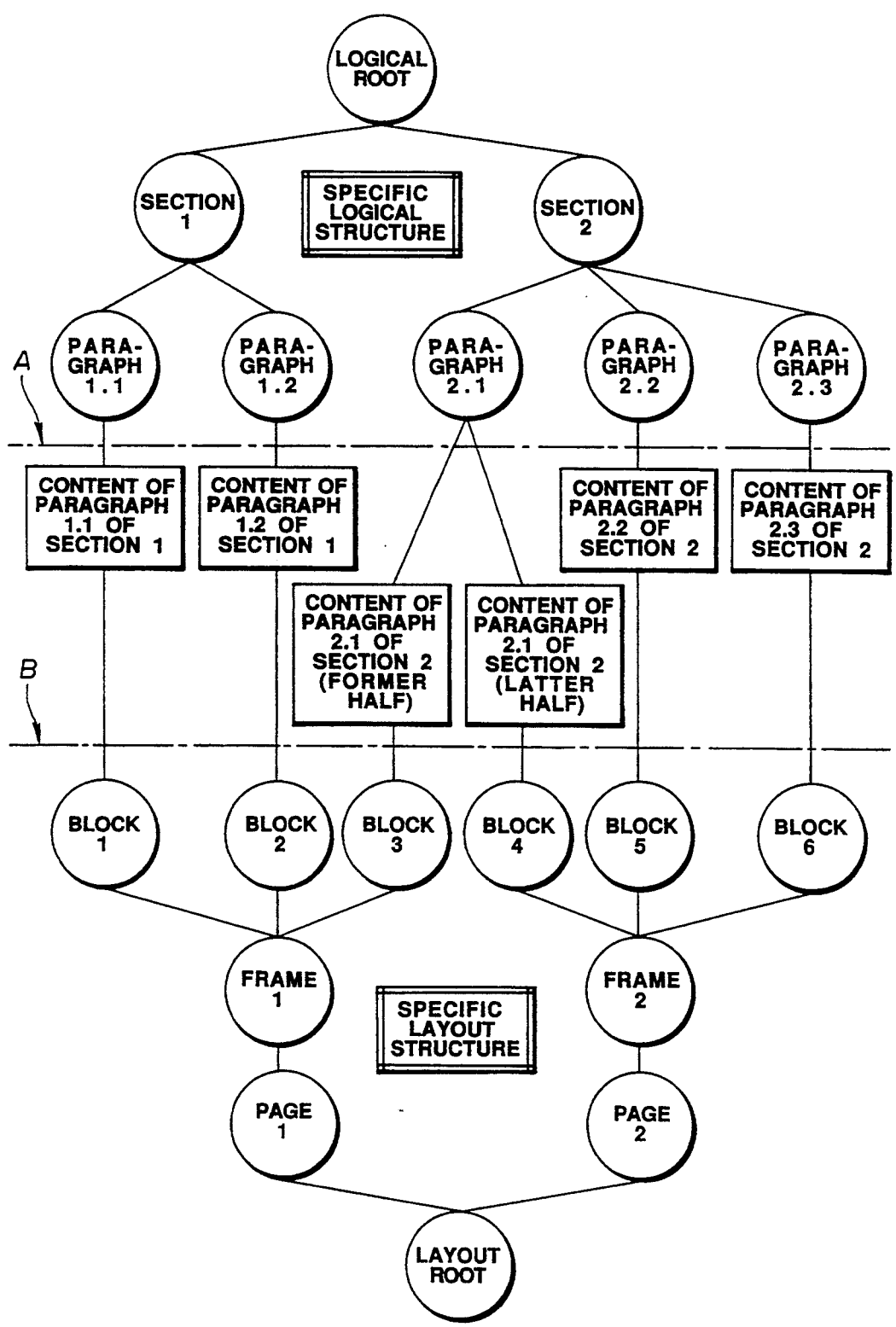
FIG. 12 is a diagram for explaining the relation between the specific logical structure and a specific layout structure in the ODA.

If there is a logical object having the category identifier #FIG in a specific logical structure, this indicates that no document content is laid out in the frame object c. Therefore, a different candidate must be searched. To search the different candidate, since the minimum layout-enable tree has been generated, by making reference to the minimum layout-enable tree, it is determined what portion the object class E having the category identifier #FIG as its attribute "permitted categories" is to be linked to. More specifically, class ID nodes are found in the minimum layout-enable tree shown in FIG. 7, and the class ID node of the "Class Object: E" is selected. The processing proceeds from the selected class ID node S15 to superior class ID nodes, i.e., to the class ID node S11 through the class ID node S13. The superior nodes can be traced by making reference to the "Sup" of each of the nodes. The value of the "Selection" of the CHO node S11 which has thus been reached may be altered from "12" to "13". The layout-enable tree obtained after the value of the "Selection" of the CHO node S11 has been altered to "13" is shown in FIG. 10.

In accordance with the above-described present embodiment, unlike the conventional example, it is not necessary to generate layout objects while repeating trial and error even if the range of selection from structures is wide, that is, even if a large number of terms follow the CHO or OPT term, or even if the class of a layout object to be searched is present at a structurally deep level, that is, even if a tree has a considerable height as written in the form of a layout-enable tree. Accordingly, it is possible to substantially restrain processing for generation and deletion of unnecessary layout objects. It is, therefore, possible to rapidly effect processing for layout retry, whereby an overhead can be reduced. In consequence, it is possible to rapidly effect processing for generating a layout structure corresponding to a particular document.

Although in the above-described embodiment the document layout processing device according to the present invention is applied to an apparatus for performing layout processing based on the ODA, the present invention is not limited to such an apparatus and is also applicable to other kinds of apparatus.

The present invention is applicable to, for example, a document processing apparatus, a word processor, a form processing apparatus, a data base system or the like.

More specifically, the document layout processing device according to the present invention can be applied to a document processing apparatus or a word processor which receives an input document (the logical structure and content thereof), lays out the document content and outputs the laid out document to an output device such as a display or a printer in accordance with the operation of an input device such as a keyboard or a mouse by a user or a system. It is, therefore, possible to rapidly effect processing for laying out the document content inputted by the user and converting it into information which can be visualized.

The document layout processing device according to the present invention can also be applied to the form processing apparatus having the function of processing data stored in the apparatus or data received by data communication, automatically formulating a new form, laying out the form in a predetermined layout form, and displaying it on the display screen of a display unit or printing it on paper by a printer. It is, therefore, possible to rapidly effect processing for laying out the processed form content and converting it into information which can be visualized.

The document layout processing device according to the present invention can also be applied to the data base system which executes a search in response to an inquiry inputted by the operation of a terminal by a user and displays the search result on the display screen of a display unit or prints it on a paper by a printer. It is, therefore, possible to rapidly effect processing for laying out the content of the search result and converting it into information which can be visualized.

As described above, in accordance with the present invention, a layout intermediate data structure is initially generated which represents a minimum layout structure and attribute information, and a specific layout structure is then generated by altering the minimum layout structure on the basis of a document to be laid out and the attribute information. Accordingly, it is sufficient to perform processing for generating and deleting a minimum required structure (object), whereby it is possible to improve the efficiency of layout processing.

Various modifications may be made without departing from the true scope and spirit of the present invention, and the foregoing description of the embodiments is solely for the purpose of illustration and is not to be construed as limiting the scope of the present invention. The scope of the present invention is defined by the appended claims and is not limited by the description hereof. To the contrary, the present invention is intended to cover all various modifications and equivalent variations included within the scope of the appended claims.

What is claimed is:

1. A document layout processing method in which a suitable layout structure is selected in accordance with a document content from a layout template specifying constraints for generating layout structures and, a layout structure in which the document content is laid out is generated, the method comprising the steps of:

generating a tree structure as an intermediate data structure, when said constraints specified in the layout template are represented by generation rules of grammar from which hierarchal structures are derived, and making corresponding non-terminal symbols and terminal symbols including operators, which appear on the generation rules of grammar, with the nodes of the tree structure;

holding in a node among the plurality of nodes, which is being generated in association with the operator included in the generation rules of grammar, operator type information indicative of a type of the operator and manipulation history information indicative of a history of addition or deletion of an immediately subordinate node to or from the node being generated; and adding or deleting the node to or from the tree structure based on the operator type information and the manipulation history information.

2. A document layout processing device in which a suitable layout structure is selected from a layout template specifying attributes for generating layout structures in accordance with a document content and a layout structure in which the document content is laid out is generated, the system comprising:

intermediate data structure generating means for generating an intermediate data structure in the form of a tree structure, said tree structure having a plurality of nodes including an immediately subordinate node, said tree structure representing simultaneously both the attributes specified in the layout template and a layout structure being generated;

intermediate data structure holding means for holding the intermediate data structure generated by the intermediate data structure generating means;

intermediate data structure altering means for altering the intermediate data structure held in the intermediate data structure holding means, based on the document content and the attributes represented by the intermediate data structure held in the intermediate data structure holding means;

specific layout structure extracting means for extracting a layout structure in which the document content is laid out, from a newest intermediate data structure held in the intermediate data structure holding means;

the constraints specified in the layout template being represented by generation rules of grammar from which hierarchal structures are derived;

non-terminal symbols and terminal symbols including operators, which appear on the generation rules of grammar, are made to correspond with the nodes of the tree structure;

operator type information indicative of an operator type and manipulation history information indicative of a history of addition or deletion of an immediately subordinate node to or from a node being generated are held in the node being generated among the plurality of nodes in association with the operator included in the generation rules of grammar; and a node is added or deleted to or from the tree structure based on the operator type information and the manipulation history information.

3. A document layout processing method in which when a structure representing logical divisions of a document content is defined as a logical structure and a structure representing layout divisions of a document is defined as a layout structure, a layout structure corresponding to a logical structure of a specific document is generated on the basis of a template specifying constraints for generating a plurality of layout structures and a generation history of a layout structure and also for selectively generating a suitable layout structure from among the plurality of layout structures, the method comprising the steps of:

generating an intermediate data structure which is a structure representing simultaneously both template information corresponding to the template and generation history information indicative of said generation history of a layout structure based on the template and also generating as an initial state of an intermediate data structure a structure corresponding to a minimum layout structure common to the plurality of layout structures generatable based on the template;

updating the intermediate data structure by referring to the template information and the generation history information in the intermediate data structure of the initial state so that the logical structure of the specific document conforms to the template; generating a final intermediate data structure; and generating a layout structure corresponding to the logical structure of the specific document on the basis of the final intermediate data structure.

4. A document layout processing method in which when a hierarchal structure representing logical divisions of a document content is defined as a logical structure and a hierarchal structure representing layout divisions of a document is defined as a layout structure, a structured document containing at least a logical structure of a specific document content and a template specifying constraints for generating a plurality of layout structures said plurality of layout structures being stored, and also for selectively generating a suitable layout structure from among the stored plurality of layout structures, and a layout structure corresponding to the logical structure of the specific document content is generated on the basis of the template, the method comprising the steps of:

generating an intermediate data structure which is a hierarchal structure representing simultaneously both template information corresponding to the template and generation history information indicative of a generation history of a layout structure based on the template and also generating as an initial state of the intermediate data structure a hierarchal structure corresponding to a minimum layout structure common to the plurality of layout structures generatable based on the template;

updating the intermediate data structure by referring to the template information and the generation history information in the intermediate data structure of the initial state so that the logical structure of the specific document content conforms to the template generating a final intermediate data structure; and generating a layout structure corresponding to the logical structure of the specific document content on the basis of the final intermediate data structure.

5. A method according to claim 4, wherein the intermediate data structure is a tree structure, said tree structure having a plurality of nodes, including an immediately subordinate node and wherein on the basis of the template, manipulation possibility information indicative of addition or deletion of the immediately subordinate node and manipulation history information indicative of addition or deletion of the immediately subordinate node and manipulation history information indicative of addition or deletion of the immediately subordinate node are held in the plurality of nodes; and the layout processing is executed by adding or deleting a node to or from the tree structure on the basis of the manipulation possibility information and the manipulation history information so that the logical structure of the specific document content conforms to the template.

6. A method according to claim 4, wherein when the template is represented by generation rules of a grammar from which hierarchal structures are derived, nodes including an immediately subordinate node are generated in correspondence with non-terminal symbols which appear on the generation rules and terminal symbols including operators and also a tree structure configured by said nodes is generated as the intermediate data structure;

in a node among the nodes, which is being generated in association with the operator, operator type information indicative of a type of the operator and manipulation history information indicative of a history of addition or deletion of the immediately subordinate node to or from the node being generated are held; and the layout processing is executed by adding or deleting the node to or from the tree structure based on the operator type information and the manipulation history information so that the logical structure of the specific document content conforms to the template.

7. A document layout processing device in which when a hierarchal structure representing logical divisions of a document content is defined as a logical structure and a hierarchal structure representing layout divisions of a document is defined as a layout structure, a structured document containing at least a logical structure of a specific document content and a template specifying constraints for generating a plurality of layout structures means for storing the plurality of layout structures and also for selectively generating a desired layout structure from among the plurality of stored layout structures, and a layout structure corresponding to the logical structure of the specific document content is generated on the basis of the template, the device comprising:

intermediate data structure generating means for generating an intermediate data structure which is a hierarchal structure representing simultaneously both template information corresponding to the template and generation history information indicative of a generation history of a layout structure based on the template and also for generating as an initial state of the intermediate data structure a hierarchal structure corresponding to a minimum layout structure common to the plurality of layout structures generatable based on the template;

intermediate data structure holding means for holding the intermediate data structure generated by the intermediate data structure generating means;

intermediate data structure altering means for altering the intermediate data structure held in the intermediate data structure holding means by referring to the template information and the generation history information held in the intermediate data structure holding means so that the logical structure of the specific document content conforms to the template; and specific layout structure extracting means for extracting a layout structure corresponding to the logical structure of the specific document content from a latest intermediate data structure held in the intermediate data structure holding means.

8. A device according to claim 7, wherein the intermediate data structure generating means generates a tree structure as the intermediate data structure, said tree structure constituted by a plurality of nodes and at east one immediately subordinate node, and, on the basis of the template, stores in the intermediate data structure holding means manipulation possibility information indicative of addition or deletion of an immediately subordinate node to or from the plurality of nodes and manipulation history information indicative of addition or deletion of the immediately subordinate node; and the intermediate data structure altering means executes the addition or deletion of a node to or from the tree structure on the basis of the manipulation possibility information and the manipulation history information so that the logical structure of the specific document content conforms to the template.

9. A device according to claim 7, wherein the intermediate data structure generating means, when the template is represented by generation rules of a grammar from which hierarchal structures are derived, generates nodes in association with non-terminal symbols which appear in the generation rules and terminal symbols including operators and also generates as the intermediate data structure a tree structure configured by the nodes said nodes including an immediately subordinate node;

the intermediate data structure holding means, in a node among the nodes, which is being generated in association with the operator, holds operator type information indicative of an operator type and manipulation history information indicative of a history of addition or deletion of the immediately subordinate node to or from the node being generated; and the intermediate data structure altering means executes the addition or deletion of a node to or from the tree structure based on the operator type information and the manipulation history information so that the logical structure of the specific document content conforms to the template.

* * * * *